United States Patent
Guigné et al.

(10) Patent No.: US 10,713,527 B2
(45) Date of Patent: Jul. 14, 2020

(54) OPTICS BASED MULTI-DIMENSIONAL TARGET AND MULTIPLE OBJECT DETECTION AND TRACKING METHOD

(71) Applicant: SmartCone Technologies, Inc., Stittsville (CA)

(72) Inventors: Jacques Y. Guigné, Paradise (CA); Nicholas G. Pace, Bath (GB)

(73) Assignee: SMARTCONE TECHNOLOGIES, INC., Stittsville, Ontario (CA)

(*) Notice: Subject to any disclaimer, the term of this patent is extended or adjusted under 35 U.S.C. 154(b) by 97 days.

(21) Appl. No.: 16/150,331

(22) Filed: Oct. 3, 2018

(65) Prior Publication Data

US 2020/0110962 A1 Apr. 9, 2020

(51) Int. Cl.
| G06K 9/62 | (2006.01) |
| G06T 7/90 | (2017.01) |
| G06T 7/80 | (2017.01) |
| G06T 7/50 | (2017.01) |
| G06T 7/73 | (2017.01) |

(52) U.S. Cl.
CPC .......... *G06K 9/6202* (2013.01); *G06T 7/50* (2017.01); *G06T 7/73* (2017.01); *G06T 7/85* (2017.01); *G06T 7/90* (2017.01)

(58) Field of Classification Search
None
See application file for complete search history.

(56) References Cited

U.S. PATENT DOCUMENTS

| 2004/0128102 A1* | 7/2004 | Petty | G01S 5/163 702/150 |
| 2016/0124074 A1* | 5/2016 | Wonneberger | G01C 3/32 356/4.01 |
| 2019/0220002 A1* | 7/2019 | Huang | G06T 7/593 |

FOREIGN PATENT DOCUMENTS

DE 102014106718 A1 11/2015

OTHER PUBLICATIONS

International Search Report from the International Searching Authority, dated Jan. 21, 2020, for International Application No. PCT/IB2019/058353.
Written Opinion from the International Searching Authority, dated Jan. 21, 2020, for International Application No. PCT/IB2019/058353.

* cited by examiner

Primary Examiner — Fayyaz Alam
(74) Attorney, Agent, or Firm — Richard A. Fagin

(57) ABSTRACT

A method for determining a spatial position of an object includes obtaining an image with at least one camera. The object is identified in the image. At least one of a pixel size of the object in the image and a pixel offset of the object from a center of an image plane of the at least one camera is determined. A distance between the object and the camera image plane is determined using either the pixel size and the pixel offset. The spatial position is determined using the distance and at least one known distance between the object and another element of the image.

14 Claims, 8 Drawing Sheets

OPTICS BASED MULTI-DIMENSIONAL TARGET AND MULTIPLE OBJECT DETECTION AND TRACKING METHOD

CROSS REFERENCE TO RELATED APPLICATIONS

Not Applicable.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of mobile sensing platforms for multi-dimensional object detection and tracking that can be rapidly deployed from the ground and/or from an airborne device, in a randomly oriented and changing environment.

Multi-dimensional object detection and tracking systems known in the art are constrained by required precision of camera alignment and on the level of precision required in fixing positions of multiple targets that require detection and targeting. These constraints can make it difficult and expensive to provide, for example, continuous safety tracking of workers along a roadway. Security related monitoring of incoming traffic and exact knowledge of the existence and movements of workers requires detection and tracking approaches beyond the capabilities of existing conventional multi-dimensional tracking systems, which are configured on the basis of precisely known positions of at least two sensors. These two known positions are critical to determining the spatial placement of an object in relation to the sensors. Using standard Euclidean geometry, known techniques can calculate the 3D position of an object (i.e., a target). However, such determinations require traditional fixed survey platforms to be used for the sensors.

SUMMARY

A method for determining a spatial position of an object from a camera image according to one aspect of the present disclosure includes obtaining an image with at least one camera. The object is identified in the image. At least one of a pixel size of the object in the image and a pixel offset of the object from a center of an image plane of the at least one camera is determined. A distance between the object and the camera image plane is determined using either the pixel size and the pixel offset. The spatial position is determined using the distance and at least one known distance between the object and another element of the image; and In some embodiments, the identifying the object comprises cross-correlating the image with a template image of the object.

Some embodiments further comprise calculating an intensity ratio of at least one color component in an object part of the image with an intensity ratio of the at least one color component in the template image.

In some embodiments, the determining the distance using the pixel size comprises associating a known size of the object with the distance and the pixel size.

In some embodiments, the determining the distance using the pixel size is automatically selected when the object is at least as large as a threshold pixel size in the image.

In some embodiments, the pixel size is correlated to the object when the object has a known size.

In some embodiments, the object comprises a sphere.

In some embodiments, the determining the distance using the pixel offset comprises associating the pixel offset with a known lateral separation between the object and the other element of the image.

In some embodiments, the known offset comprises a known distance between the object and a second object.

In some embodiments, the object and the other element comprise spherical targets disposed in a field of view of the camera, the method further comprises: determining a center target in the image by determining the one of the targets having a minimum value of a distance sum; determining an initial value of a camera position; generating a simulated image; calculating a metric based on target positions for various camera positions; repeating calculating the metric until the metric falls below a selected threshold, wherein the camera position is determined; and repeating the generating the simulated image, calculating the metric and for all target associations.

A method for determining a spatial position of an object from a camera image according to another aspect of the present disclosure includes disposing a plurality of targets having known spatial relationship between them in a field of view of at least one camera. An image is obtained of the field of view. A spatial position of the at least one camera is determined using the known spatial relationship to calibrate image pixel separation to distance. The spatial position of the object is determined using the determine spatial position and the calibrated pixel separation.

Some embodiments further comprise correcting the calibrated pixel separation for orientation of an image plane of the at least one camera by determining a centermost one of the plurality of targets.

In some embodiments, the centermost one of the plurality of targets is determined by calculating a minimum distance sum, each distance sum comprising a sum of distances between each target in the image and all other targets in the image.

In some embodiments the camera position is determined by assuming an initial camera position X Y; calculating a simulated image using the initial camera position; calculating a metric M based on positions within the image of each of the targets while varying the initial camera position; repeating the calculating the metric for each varied initial camera position until the metric falls below a selected threshold; and determining the camera position as the varied camera position when the metric falls below the selected threshold.

Other aspects and advantages will be apparent from the description and claims following.

BRIEF DESCRIPTION OF THE DRAWINGS

FIG. 2 shows geometry of the method in real space.

DETAILED DESCRIPTION

Figure 1:
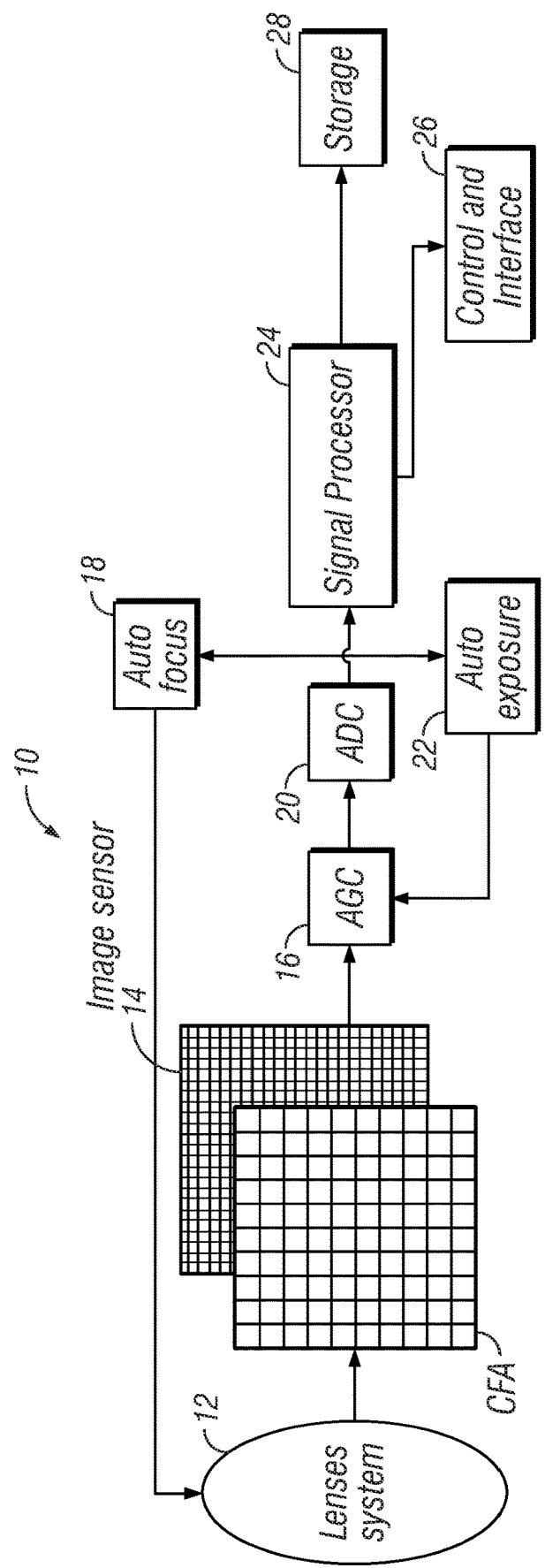
FIG. 1 shows a functional block diagram of a digital camera.

FIG. 1 shows a functional block diagram of a digital camera that may be used in some embodiments to acquire images for processing as will be further explained below. The camera 10 may comprise an optical lens system 12 to focus light from images in a field of view on an image sensor 14. The image sensor 14 may comprise, for example, a charge coupled device. The image sensor 14 may lie in a plane within the camera, and may comprise individually addressable detection elements or "pixels" (not shown separately) defined by coordinate position within the plane. A signal processor 24 such as a microprocessor, microcontroller or any similar device may provide control signals to operate an automatic exposure control 22 and automatic gain control 16 to normalize intensity of image signals from the image sensor 14 as well as to process signals from the image sensor 14 as explained further below. A user control, interface and display 26 may be in signal communication with the signal processor 24 to cause the camera 10 to perform user determined functions as well as to display results of image processing to be explained further below. Image signals may be stored in a mass storage device 28 for processing to be performed other than in the camera 10 if so desired in some embodiments.

A method according to the present disclosure may use cameras, such as charge coupled device digital cameras as explained with reference to FIG. 1, to determine the spatial positions of targets. Spatial positions of targets can be related to, for example, safety of a workforce in areas where individual persons forming the workforce (wherein the individual persons are defined as targets) are moving in the presence of moving other moving objects such as pedestrians, cyclists, cars and trucks complicating the scene as additional possible targets. Targets are essentially objects which may be first identified in the camera image as a uniform occurrence of similarly colored (or gray scale density) contiguous image pixels occupying more than a selected threshold number of contiguous image pixels. In some situations the targets may be sufficiently large that their pixel coverage in the image plane can be used to determine target distance from the camera.

In some embodiments to be described below, the camera(s) deployment parameters may be required to be known. That is to say, the position of camera image center(s) in space and their roll, pitch, yaw may be required to be known.

In essence, once targets have been identified in camera images, the pixel distances of the target images relative to the image space is determinable and may provide accurate information concerning the angle subtended by the target in the camera image. If known separation distances between targets and other imaged objects, or cameras, are known or determinable, angles between image position and camera aiming centerline can be converted to spatial positions of the targets.

In an embodiment of a method according to the present disclosure, self-location of a camera may be performed using two or more targets, for example spherical targets, suspended at a known height and at known distances apart. In such embodiment, the camera deployment information (i.e., its spatial position and orientation) is not needed. The camera may be handheld by the user and aimed such that the targets are captured in one or more images. The targets' pixel diameters are extracted from the image. This allows the range (distance from the camera) to each target to be calculated. These ranges, together with known spatial positions of the targets, enable the spatial position of the camera to be determined. This self-location could be used by moving devices indoors or outdoors or by persons for indoor location. It may be expected to obtain an accuracy of less than a meter out the lateral displacements of 30 m. Self-location of the spatial position of the camera may then be used to determine spatial position of objects in the camera image other than the targets.

The targets, in embodiments in which camera deployment information is required, may be, for example, lamps of different and distinct colors. In such embodiments, at least two spaced apart cameras are required. Such targets may be, for example, incorporated into helmets worn by persons or placed on devices whose locations are to be tracked. Targets for different purposes may be colored as may be chosen by a user. Area coverage extent will determine how many cameras are needed. The determined positions of multiple targets present can be indicated on a display with vector arrows indicating target movement and past position history. This information can be superimposed on a grid designed by the user for any specific purpose. Integration of the spatial position of targets with other sensor information is envisaged (e.g., a car approaching).

In another embodiment in which camera deployment information is required, targets may be individual spherical targets of uniform color which may be brightly painted or illuminated from within. For a certain known target size, only one camera is required to extract the range and position of the target, out to a particular range. Beyond that range, the target location determination can continue using at least two cameras. Targets of such size may be more appropriate for tracking equipment rather than persons.

Cameras may, for example, be mounted on a support such as a pole so that the cameras' image planes are at a known angles with respect to vertical and attached to the support in such a way that rotation about a vertical axis through the camera image plane can be obtained and the rotational angle measured. The height of the camera image plane above the ground may be a few meters, and known, to provide better unobstructed views of targets. Camera rotation about a vertical axis can be independent for each such camera provided the rotation angles are determinable.

The cameras can also be aerially mounted, such as on a drone or a tethered helium balloon, and the positions of targets on the ground can be monitored. The height of deployment afforded by the drone/balloon allows greater flexibility in area coverage and importantly the vertical distance to all targets will be effectively constant. This allows for single camera processing. The camera(s) may be mounted on a stabilized platform.

The method using a single camera and finite, known size targets can be applied, for example, to helicopter/drone navigation in last stages of landing. A camera attached to a drone may image, for example, a circular target comprising a number of lights of a certain color on the ground and by measuring the diameter of the circle within the camera image, the range to the ground is readily determinable. The camera may be mounted on gimbals or a stabilized platform. If the camera is actually aimed toward the circular target, the target appears as an ellipse in the image, depending on the camera height and lateral displacement, with its largest linear size corresponding to the circle diameter.

A target of interest may be imaged in advance at close range to provide a template. The template is essentially an area, which may be circular or square, of the image over which the color or gray scale density is substantially uniform.

The template may be resized so that templates have the same general shape but extend over different number of pixels. This enables different sized targets to be detected at different ranges by scanning over a suitable range of template sizes. The image on one camera containing the targets is cross correlated with the template to provide a matrix of the normalized cross correlation (NCC). Targets are identified as those regions for which the NCC is greater than a certain fraction of the maximum NCC.

The field of view of a camera divided by the number of pixels horizontally and vertically across the display may in some cameras provide essentially the same result in term of P, the number of pixels per degree. Using P, the angles subtended by the target at its position on the camera display is determinable. This allows the range to a target of known size to be obtained. Similarly, with two separated cameras, the angles to a small target as imaged by each camera, together with the camera separation enables calculating the spatial position of the target. One camera or both cameras may be rotatable about a vertical axis to provide full rotation spatial coverage. Such rotation angles are readily measured and incorporated into calculation of target position.

The range at which targets may be identified depends on the target size and the camera P values. For the camera used in the examples below, the resolution, expressed as pixels per degree, is approximately P=56 pixels per degree. If, for detection, it is required that the target image has a diameter of Dp pixels, the target must subtend an angle of Dp/P degrees at the camera. If the angle subtended by a target at a camera is θ degrees, then the image of target has an extent of (θ*P) pixels.

At range of 30 m, a target of diameter 10 cm subtends an angle of (0.1/30)*57.3 degrees and the image size is 0.1*57.3*56/30=11 pixels. Thus, the range limitation of the procedure to be described below will be limited by the target size and the camera resolution. However, cameras with high pixel density (resolution) are readily available in which the P value may be well over 100 or more pixels per degree.

Irrespective of the embodiment of camera deployment, targets are identified from the camera images. The image analysis may take one or more of several forms depending on the camera deployment, for example:
1. Self-location, Finite sized targets or point targets detected by one camera;
2. Point targets detected by two or more cameras, where the cameras are ground based;
3. Point targets detected by two or more cameras, where the cameras are tethered balloon or otherwise aerially based.

The relation between the pixel coordinates of a target in the image and the real world coordinates of that target involves calibration procedures which are well known in the literature. The purpose of this disclosure is well served by adopting a simple approach to this relation.

Figure 2:
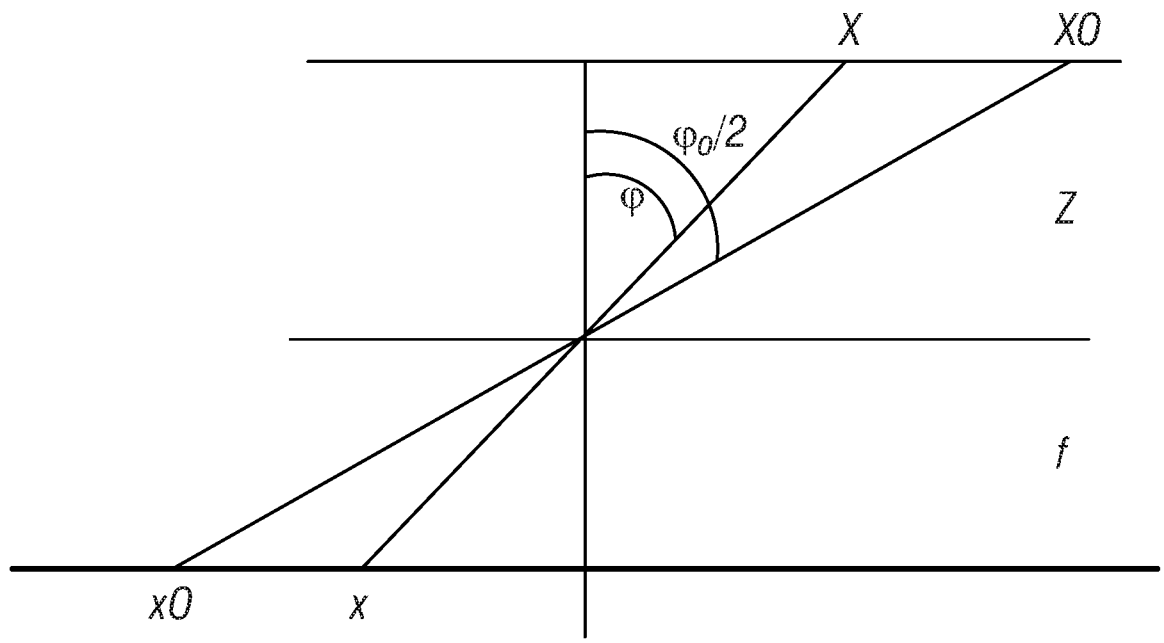
FIG. 2 shows various camera and target parameters.

Referring to FIG. 2, if the camera has a field of view of $\varphi_0$ degrees and $x_0$ is the number of pixels in the camera image plane, then a point object in the field of view along a line at an angle φ with respect to the camera aiming direction (generally understood to mean a line extending perpendicular to the image plane from the center of the image plane) will image at a point located $x_1$ pixels from the center of the camera image plane. The range (distance) from the target to the camera image plane is Z meters, and the target is at distance Xt meters laterally from the aiming direction, then the range Z can be expressed as:

$$Z = \frac{X_t x_0}{2 x_1 \tan(\frac{\varphi}{2})} \quad (1)$$

Two possible approaches to self-location are described below. Firstly, the range to spherical targets which are at a known distance apart from each other may be used to calculate the camera position using the lateral pixel separation detected in the image and the known distance. A possible advantage of using such an approach is that the diameter of a sphere observed on a camera image depends on its range rather than the camera angle. Secondly, the distance between point targets (expressed in pixels) in an image is related to the range and offset (lateral distance) of the camera. This approach requires the camera to be aimed approximately at the center of the point targets.

Figure 5:
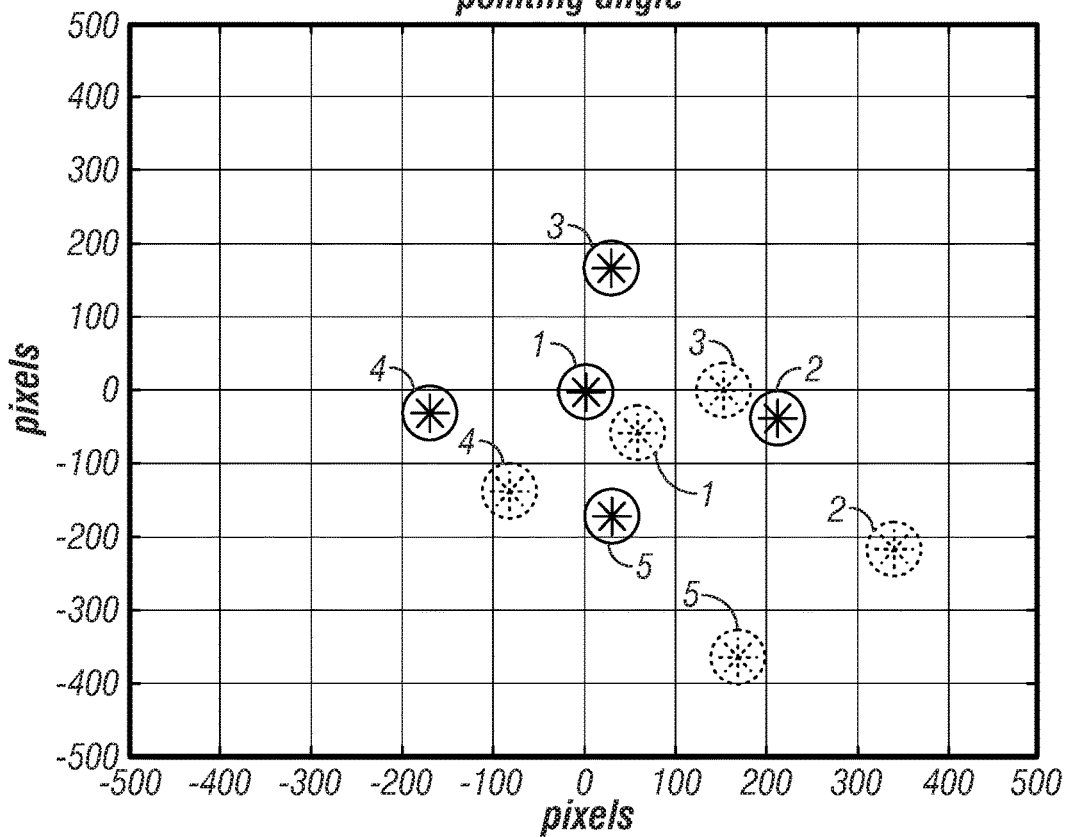
FIG. 5 shows how an image of a target array distorts with respect to camera aiming direction.

The image of the target array will appear as distorted version of the real space target array due to the viewing angle and camera position. An example of this effect is shown in FIG. 5. Processing procedures described below allow the pixel positions of the targets to be used to extract the position (XY coordinates) of the camera.

A. Use of Known Size Spherical Targets:

The concept is for a single camera to be aimed by a user so that an image of several known size targets at known positions, preferably several meters above the camera is obtained. The targets may be spheres in some embodiments so that the camera roll, pitch and yaw do not substantially affect the target images. That is to say, the camera orientation does not introduce perspectives into the image, except insofar as more distant targets occupy fewer pixels. However, for some modestly priced cameras and many cameras used in mobile phones and tablets, there is some image distortion away from the center of the image plane because the lenses in such devices are typically wide angle lenses. Provided that the user orients the camera so that the targets are as centralized as possible in the camera image area, the target image distortion is usually insufficient to affect the results. Optimum fitting of circles to the target images may be used to minimize the effect of any such distortion.

There will be a minimum range related to the need to fit the targets (the target array) into the camera image. If, for example, the maximum lateral extent of any of the targets is 5 m and the field of view of camera is, for example, 80 degrees, then the minimum range is about 4 m. This is acceptable because the user generally should not be within the lateral extent of the target as large errors occur (see Equation 9).

If a spherical target of diameter d is present in an image, its range from the camera may be determined by the expression:

$$r = \frac{dx_0}{2n\tan(\frac{\varphi}{2})} \quad (2)$$

where n is the number of pixels traversed by the target in the image.

If n is measured then, given the target diameter, the error in the range r is Δr where:

$$\frac{\Delta r}{r} \approx \frac{\Delta n}{n} \text{ and } n \approx \frac{dx_0}{2r\tan\left(\frac{\varphi_2}{2}\right)} \quad (3)$$

If the target image diameter (in pixels) can be measured to 1% accuracy, the corresponding error in the calculated range is 1%.

Figure 3:
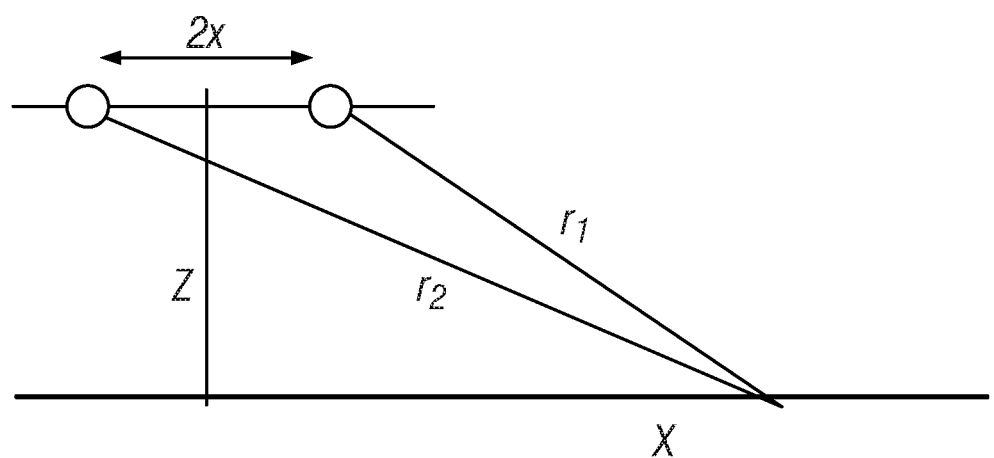

If there are two spherical targets, and referring to FIG. 3, both targets being of diameter d, at positions (x,0,Z) and (−x,0,Z), the range to the targets would be $r_1$ and $r_2$ from the camera image plane center.

$$r_1 = \frac{dx_0}{2n_1\tan\left(\frac{\varphi_2}{2}\right)} \quad (4)$$

$$r_2 = \frac{dx_0}{2n_2\tan\left(\frac{\varphi_2}{2}\right)} \quad (5)$$

Camera position X can be expressed, in two dimensions for illustration, as $$(X-x)^2 + Z^2 = r_1^2 \quad (6)$$

and $$(X+x)^2 + Z^2 = r_2^2 \quad (7)$$

The value of X, given the values of Z, $r_1$ and $r_2$ may be readily solved, for example, by an optimization routine. This becomes more desirable as the arrangement is extended to more than two targets and both the X and Y positions of the camera are required.

Figure 4:
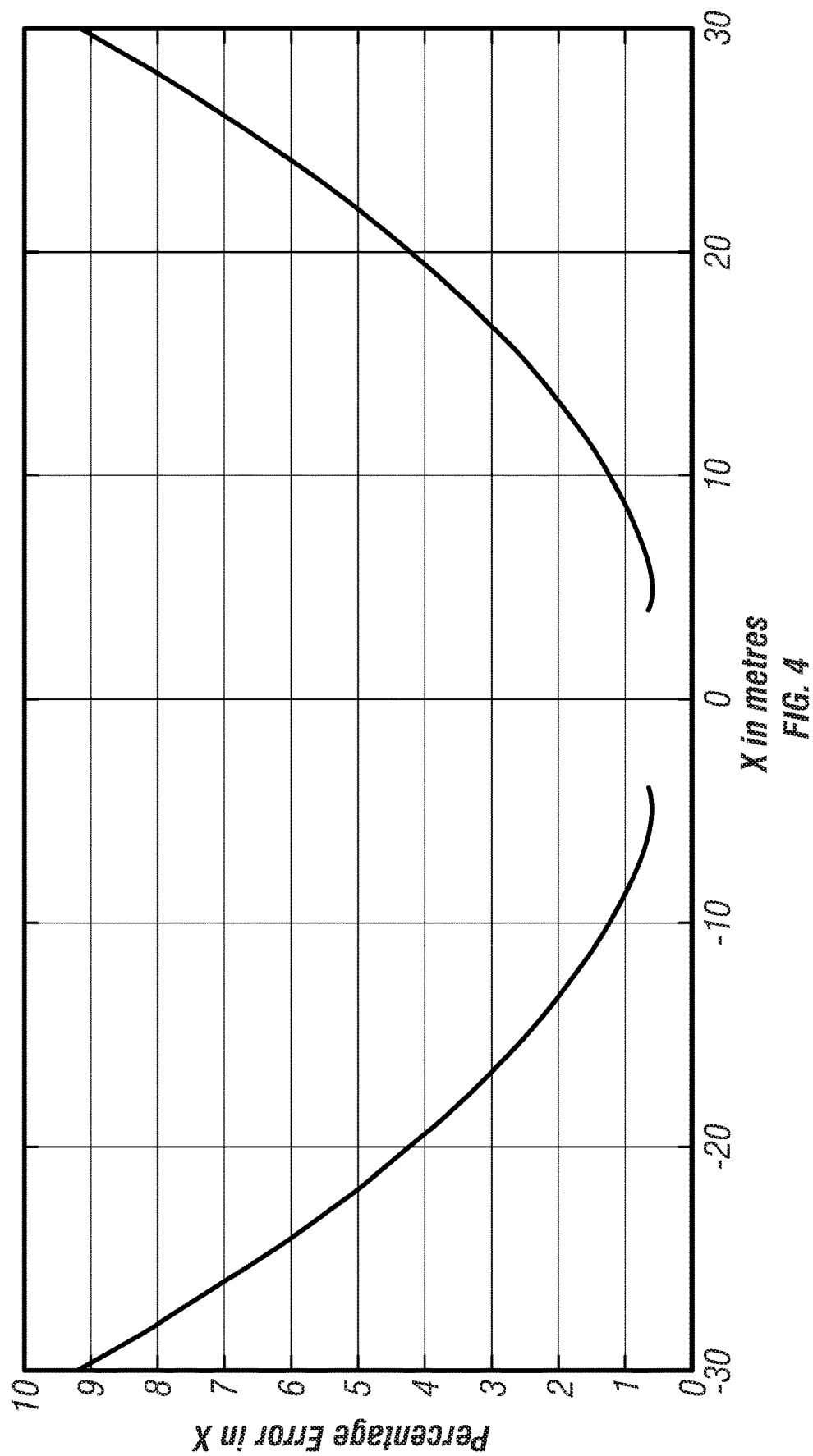
FIG. 4 shows a graph of error in self-location versus offset using spherical targets.

The error in calculating X, and referring to FIG. 4 may be expressed as:

$$\Delta X = \sqrt{\left(\left(\frac{r_1}{x-X}\right)^2\left(r_1\frac{\Delta n_1}{n_1}\right)^2 + \left(\frac{r_2}{x+X}\right)^2\left(r_2\frac{\Delta n_2}{n_2}\right)^2 + 2\left(\frac{Z}{x-X}\right)^2(\Delta Z)^2\right)} \quad (8)$$

where Δ(.) represents an error in that quantity.

The above analysis is readily modified for a camera at position X, Y and several targets near, for example, a ceiling in an interior space. The greater the number of targets the smaller the error in determined camera position X, Y. The camera position can be expressed as R=sqrt($X^2+Y^2$), θ=a tan(Y/X). If there are only two targets, then the error in camera position for constant R will be subject to variations as θ varies. With three targets, such errors can be substantially reduced by selection of different target pairs as theta changes.

The errors can also be reduced by increasing the number of pixels in the camera image plane. The above example assumes 4000 pixels. There are cameras available which provide many more pixels and would reduce the errors correspondingly. Further error reductions may be available by increasing the size of the targets and placing them further apart.

B. Use of Point Targets at Known Separation:

Several point targets may be placed at a known height Z above a camera, at known spacing between them in a horizontal plane. The user aims a camera at the array of targets deployed in a horizontal plane at a height of a few metres. The target array has for example, a center target with four others in the form of a slightly distorted cross. The distortion helps with the processing.

For the examples used the target positions are, at $Z_0$:
t1=[0 0];
t2=[(radius+0.75)*cos(0/rad),(radius+0.75)*sin(0/rad)];
t3=[(radius+0.75)*cos(80/rad),(radius+0.75)*sin(80/rad)];
t4=[(radius−0.25)*cos(170/rad),(radius−0.25)*sin(170/rad)];
t5=[radius*cos(260/rad),radius*sin(260/rad)];

Analysis of the image provides both the pixel position of each point-target and which target image corresponds with which point-target, without any need to physically distinguish the targets using for example, colors.

The user aims the camera such that the whole target array is visible in the image. In order to encompass the whole target array in the image, the angular deviation from the camera aiming angle must be less than the camera field of view. There is no need to aim (orient the center of the image) the camera at any particular target in the target array. The only requirement is that substantially the whole target array is in the image.

FIG. 5 Shows how the image of target array distorts, the distortion depending on both pointing angle from a given position of the camera and as the camera position changes. Notice that there is some asymmetry in the target array (blue), which aids in the correct association of target image points with targets. The processing of the pixel positions of the targets in the image allows the extraction of the camera position (X,Y,0).

As the image of the target array is distorted due to camera offset, it can be difficult to associate a target image with its actual position in the target array. Correct association is not essential for the extraction of the camera position. If the 'centre' target and its position in the image can be obtained, then the subsequent processing is less complicated.

Identification of the pixel position of the 'centre target' is a needed for the processing. Such pixel position may be determined by determining the minimum value of the distance sum. The sum of the distances, in pixels, from one target image point to all other target image points is called the distance sum. The target image point associated with the smallest distance sum is the image point of the centre target.

Development of a Procedure for the Extraction of X and Y

If a target is at a range R and a position $x_m$ actual distance laterally separated from a selected reference origin (0, 0, 0), then such target is at a pixel position $x_p$ in the camera image plane where:

$$x_p = \frac{P}{2\tan\left(\frac{\varphi_0}{2}\right)}\frac{x_m}{R} = \frac{Ax_m}{R} \quad (9)$$

P is the number of pixels across the image, and $\varphi_0$ is the camera image field of view. Definition of some quantities:
1. the actual (spatial) coordinates ($x_{ti}, y_{ti}, Z_0$), i=1,5 of the targets in the horizontal plane, relative to the 'centre' target; these are known;

2. the pixel coordinates ($x_{t1p}$, $y_{t1p}$) represent the 'centre' target in the camera image relative to the image centre; these are determined from the image itself;
3. the pixel coordinates ($x_{tip}$, $y_{tip}$) represent each of the other targets in the camera image relative to the image centre; these are determined from the image itself;
4. the height $Z_0$ is from the camera position (X,Y,0) to the 'centre' target; $Z_0$ is known or is determinable to a good approximation.

The extraction of the camera position (X,Y) make use of a simulated image of the target array is calculated using a guessed, assumed or estimated camera position. The pixel distance of each target from the 'centre' target in the simulated image is brought into coincidence with those pixel distances determined in the actual camera image by varying the guessed, assumed or estimated camera position. This is done with an optimization routine which minimises the differences between the sum of the pixel distances for the simulated image and the actual image. The success of the optimisation is captured in a metric M dependent on the difference between the overall sum of the pixel differences for the actual and simulated images.

$$M = \left| \sum_{1}^{4} ((x_{t1p} - x_{tip})^2 + (y_{t1p} - y_{tip})^2)_{measured} - \sum_{1}^{4} ((x_{t1p} - x_{tip})^2 + (y_{t1p} - y_{tip})^2)_{simulated} \right| \quad (10)$$

This procedure does not require that the images of targets in the actual image are each correctly associated with the targets in the simulated image.

Creation of the Simulated Image

Figure 6:
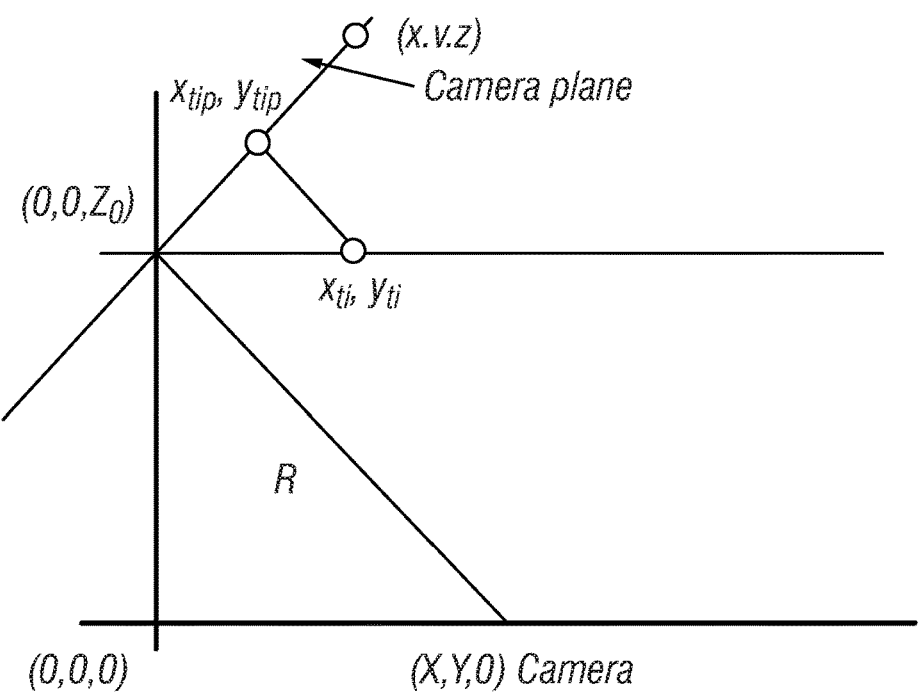
FIG. 6 shows a user camera at (X,Y,0) and the center of a target is at ($x_{t0}$, $y_{t0}$, $Z_0$). The vector from the camera to the target center is normal to the image plane of the camera.

The target array consists of several targets, only two of which are shown in FIG. 6. The 'center' target, shown at the pixel position ($x_{t0p}$, $y_{t0p}$) would be observed at the centre of the camera image if the camera aim was 'correct', that is, a line normal to the image plane in the center of the image plane were directed at the center target. Neither the camera aim nor its position (X,Y,0) are known. The value of $Z_0$ is known or can be determined to a good estimate.

For each guessed value of X,Y, the simulated image of targets is created. This requires estimating the camera plane and then the movement of the actual target positions into their pixel position on the camera plane The camera plane as shown in FIG. 6 may be represented by the expression:

$$ax + by + cz = d$$

where $$a = -X;\ b = -Y;\ c = Z_0$$

and where $$d = -Z_0^2,$$

The range R is needed to convert between distance and image pixels $$R = \sqrt{(X^2 + Y^2 + Z_0^2)}$$

Expressions for ($x_{tip}$, $y_{tip}$) may be obtained by moving the coordinates of the targets ($x_{ti}$, $y_{ti}$, $Z_0$), along the vector normal to the camera image plane by an amount $e_i$ where $$e_i = \frac{ax_{ti} + by_{ti} + cZ_0 + d}{\sqrt{(a^2 + b^2 + c^2)}}$$

and the unit vector is $$\hat{U} = \frac{a\hat{\imath} + b\hat{\jmath} + c\hat{k}}{\sqrt{(a^2 + b^2 + c^2)}}$$

so that the pixel positions of targets in the simulated image are:

$$x_{tip} = \left( x_{ti} + \frac{e_i a}{\sqrt{(a^2 + b^2 + c^2)}} \right) R/A; \quad (11)$$

$$y_{tip} = \left( y_{ti} + \frac{e_i b}{\sqrt{(a^2 + b^2 + c^2)}} \right) R/A$$

Extraction Procedure

Given ($x_{tip}$, $y_{tip}$, $Z_0$)$_{measured}$ that is, the image pixel positions of the targets in the image without a physical means to identify (i) which target is which and (ii) the height above camera of the targets, the following procedure to extract the camera position X,Y may be used:

Identify the 'centre' image in the actual image using the distance-sum;
Guess, estimate or assume the camera position X Y;
set up simulated image;
calculate the metric M, varying the X,Y camera position;
repeat until the metric falls below a selected threshold; the value of X Y, adjusted for to the known centre target offset in the image, is the camera position.

Examples of Extraction

Figure 7:
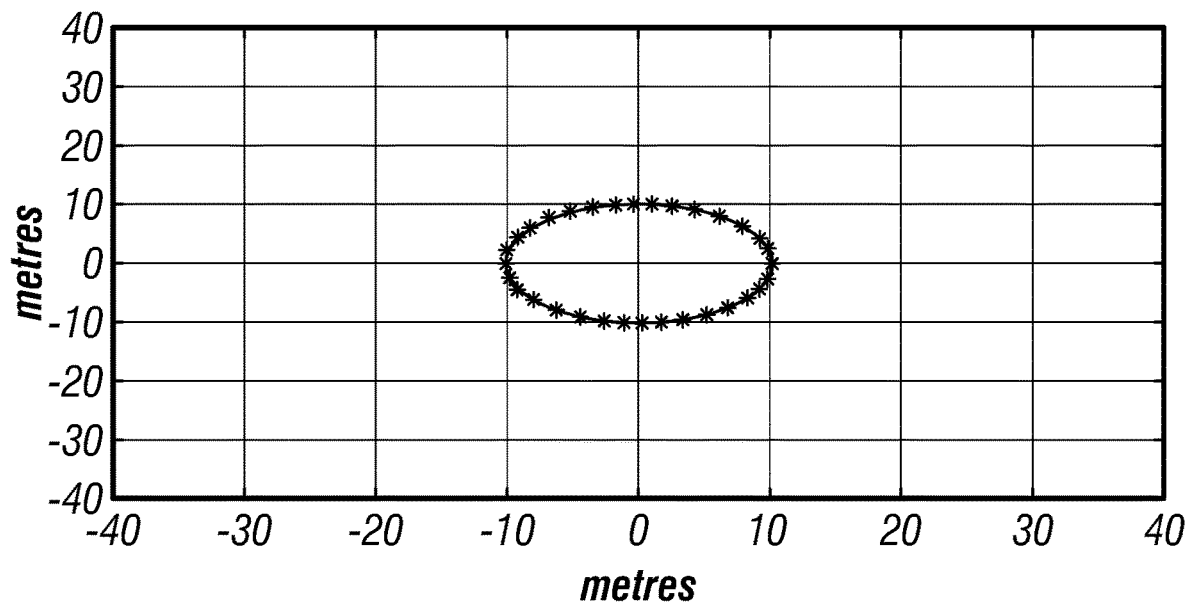
FIG. 7 shows graphically an example of extraction of camera positions around a circular path for 4 different radii.
Figure 7:
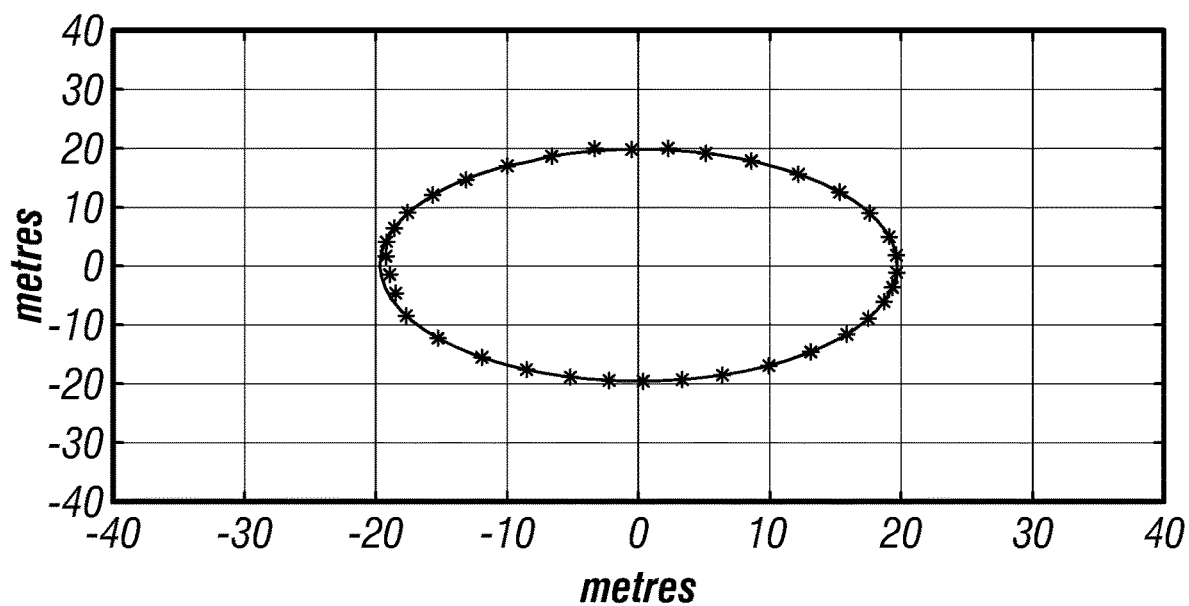
Figure 7:
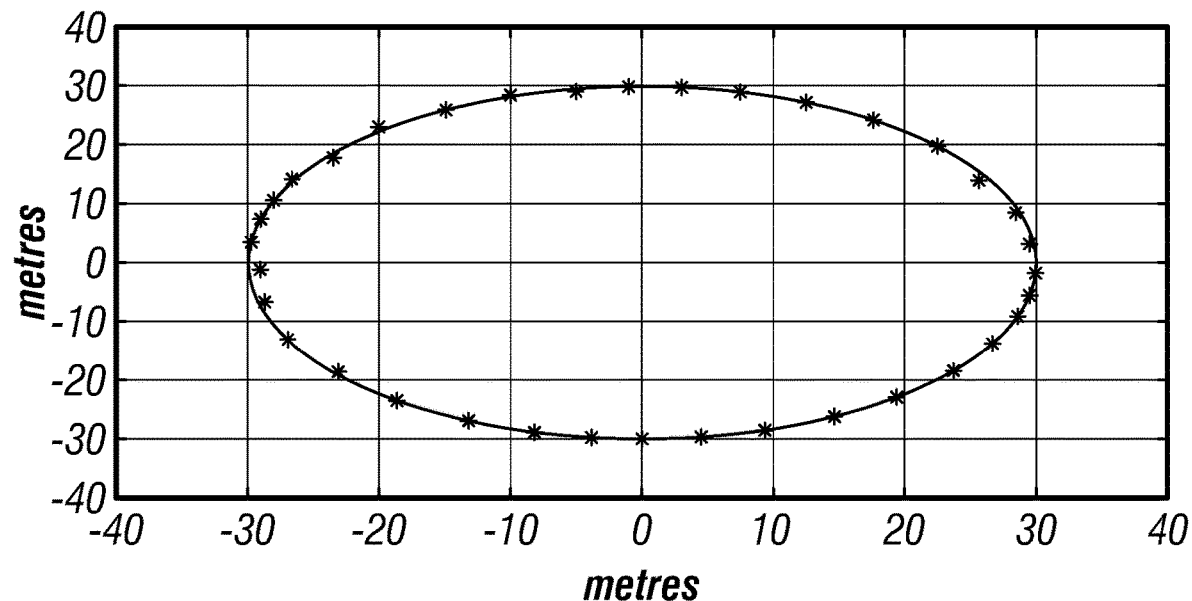
Figure 7:
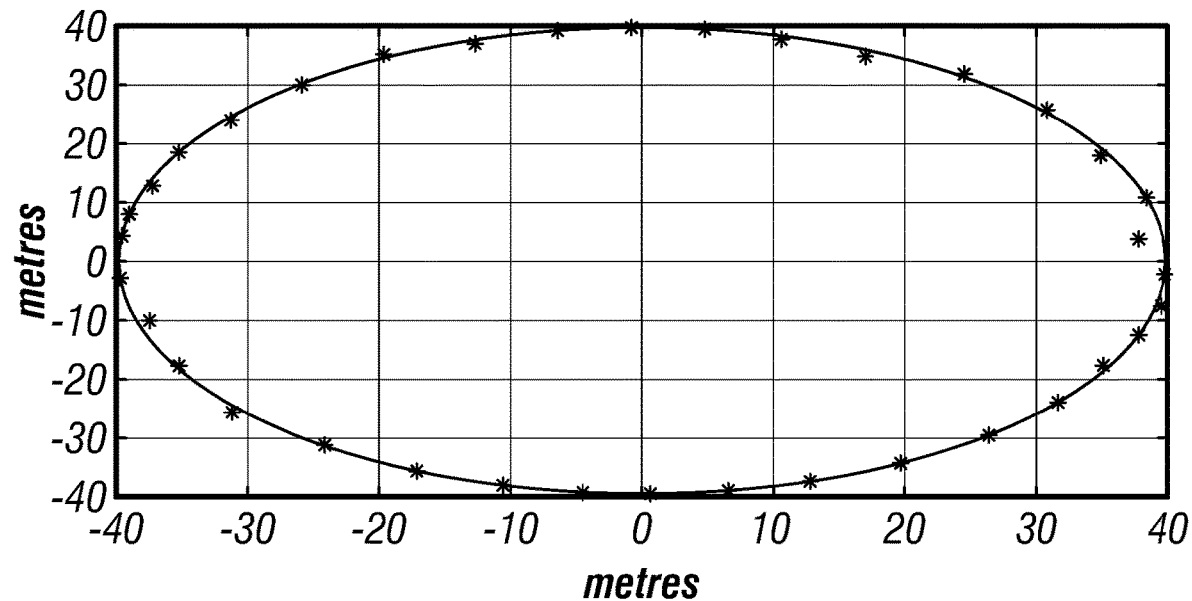

FIG. 7 shows plots related to an example camera position extraction. A camera was placed at four different selected ranges and moved in a circle around a five target array center at a constant height (Z). At each imaging position, the camera aiming angle was 'incorrect' and the X,Y position of the camera was extracted using the above procedure. The simulation included the identification of the 'center' target.

Only one realization was performed at each camera aiming angle. The results are plotted in FIG. 8 with the extracted values and the actual values against angle around the circle. The standard deviation of the error between extracted and actual values of the target position is stated in the figure. Each determination of target image pixel coordinates was given a random error of do pixels.

The standard deviations in X and Y are robust with respect to errors in the value of Z used in the extraction. This is important as although the height of the target array above the ground is known well, the actual position of the camera held by a user would be between chest and eye level approximately. For the 4 m height of the array in the example, the standard deviation in X Y is robust to errors of +/−50 cm in the assumption of height.

Extraction Errors Versus Size of Target Array

Figure 8:
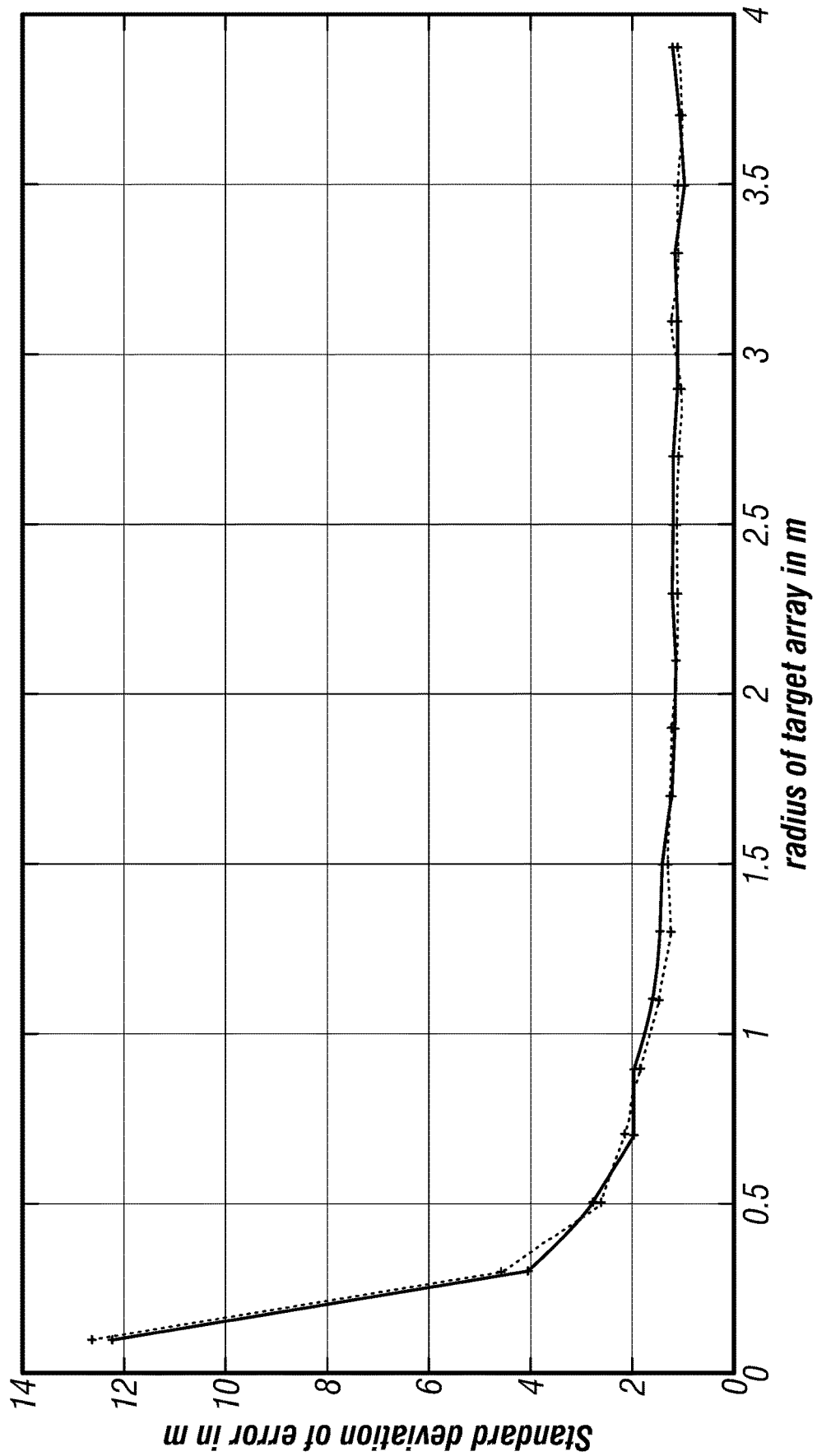
FIG. 8 a graph of error in extracted camper position as the radius of the target array increases.

The standard deviation of the error in the extracted position X and Y as the camera moves around the circle at a range of 40 m was obtained for various values of the radius of the target array. This is shown in FIG. 8.

It may be observed that for the target array height given, the errors in X and Y become fairly constant beyond a radius of 1.5 m.

C. Camera Parameters when Two Cameras are Used.

Figure 9:
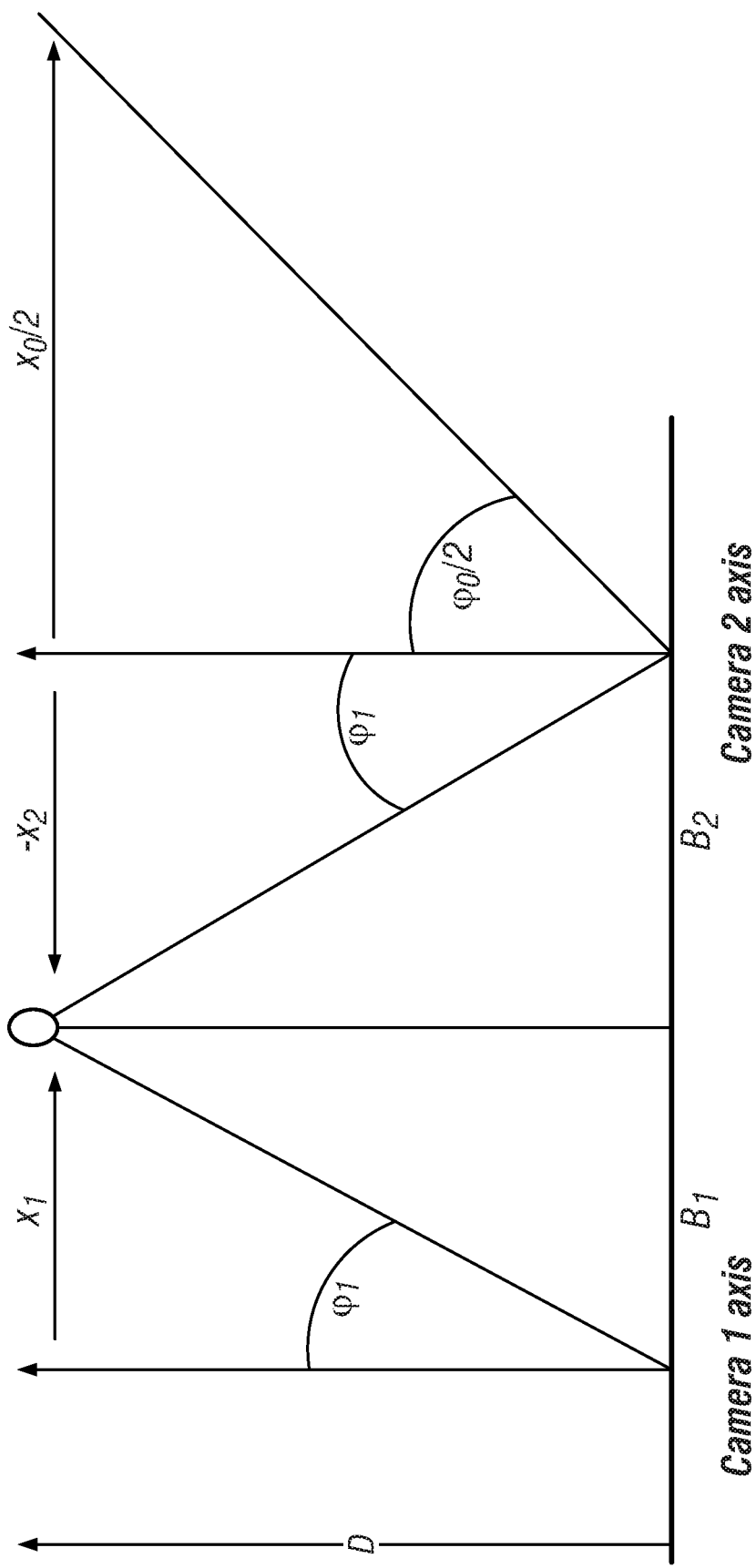
FIG. 9 shows camera parameters when two cameras are used.

Referring to FIG. 9, each camera in a pair of cameras can have a field of view of $\varphi_0$ degrees and $x_0$ pixels cover the field of view. The distance between the cameras is B=B1+B2;

$$B_1 = D \tan(\varphi_1); \; B_2 = D \tan(\varphi_2) \tag{13}$$

$$\frac{\tan(\varphi_1)}{\tan\left(\frac{\varphi_0}{2}\right)} = \frac{x_1}{\frac{x_0}{2}}; \tag{14}$$

$$\frac{\tan(\varphi_2)}{\tan\left(\frac{\varphi_0}{2}\right)} = \frac{-x_2}{\frac{x_0}{2}} \tag{15}$$

$$B = 2D\tan\left(\frac{\varphi_0}{2}\right)\frac{(x_1 - x_2)}{x_0} \tag{16}$$

$$D = \frac{Bx_0}{2\tan\left(\frac{\varphi_0}{2}\right)} \frac{1}{(x_1 - x_2)} \tag{17}$$

Here D and B are expressed in meters, $x_0$, $x_1$, $x_2$ are expressed in image pixels. For stereo images, at least part of the field of view of both cameras must overlap. The minimum range for overlap may be expressed by:

$$D_0 = \frac{B}{2\tan\left(\frac{\varphi_0}{2}\right)} \tag{18}$$

Beyond $D_0$, the lateral extent of the overlap is V:

$$V = 2\tan\left(\frac{\varphi_0}{2}\right)(D - D_0) \tag{19}$$

For larger lateral coverage, the cameras may be rotated about a vertical axis, or additional pairs of cameras could be used, each pair oriented in a different direction.

If a target is at $x_1$ pixels from the image center in camera 1 then in camera 2 the same target is observed at $$x_2 = x_1 + \frac{Bx_0}{2D\tan\left(\frac{\varphi_0}{2}\right)} \tag{20}$$

At a range of D, the same target has a separation S in pixels on the two cameras of $$S = x_2 - x_1 = \frac{Bx_0}{2D\tan\left(\frac{\varphi_0}{2}\right)} \tag{22}$$

The fractional error in the calculation of range D is the same as the fractional measurement error in the pixel differences between the two cameras.

If it is assumed that the measurement of the pixel separation can be obtained to a known accuracy or error, as an example, +/−2 pixels, then using a separation of 2 m would provide a range error of 4 m at a range of 100 m. This error drops considerably as D decreases.

If the separation B is 4 m, then the range error at 100 m would fall to 2 m. Example numbers are shown in TABLE 1, which shows examples for a camera with x0=4000 pixels, with field of view 80 degrees. The camera separation is B, the minimum range for overlap is $D_0$, the lateral extent of overlap at range D is V and the same target seen in the two images is separated by S pixels.

TABLE 1

| B (m) | D₀(m) | D (m) | V (m) | S (pixels) |
|---|---|---|---|---|
| 1 | 0.6 | 50 | 83 | 47 |
| 1 | 0.6 | 100 | 167 | 23 |
| 2 | 1.2 | 50 | 82 | 95 |
| 2 | 1.2 | 100 | 166 | 47 |
| 4 | 2.4 | 50 | 80 | 190 |
| 4 | 2.4 | 100 | 164 | 95 |

In image processing, the targets' pixel positions $(x_{p1}, y_{p1})$ and $(x_{p2}, y_{p2})$ in the respective camera image planes may be found in each of the stereo images by the procedure already described, where the values of $y_{p1}$ and $y_{p2}$ are expected to be the same for corresponding targets, as the camera separation is only along the x axis. The differences, $(x_{p1} - x_{p2})$, may be used for determination of the range. Once the range of the targets is found then the pixel coordinates $(x_{p1}, y_{p1})$ together with the range in meters may be used to locate the target in space.

D. Point Targets Observed by One Camera, Tethered Balloon-Based Cameras:

A single camera may be mounted at height on, for example a tethered helium balloon. The height will be substantially constant. If the camera is mounted on a stabilized platform so that its aiming direction is vertical, targets disposed in images of the ground can be extracted and their position obtained. These targets can be tracked continuously and provide for integration with other sensors as required by the user.

A ground based spherical target of sufficient dimensions may be used to extract continuously the actual camera position in three dimensions. The actual position of the camera may be subject to lateral movements due to wind etc. A spherical target is used, as explained previously, so that aspect to the camera is not important.

If a spherical target of diameter d is present, its vertical range or height from the camera may be calculated using the expression:

$$Z = \frac{dx_0}{2n\tan\left(\frac{\varphi_2}{2}\right)} \tag{22}$$

where n is the number of pixels traversed by the target in the image plane of the camera. The pixel coordinates of the target center may be used to position the camera knowing the target position. The analysis implemented in this embodiment can be readily performed using the equations derived above. The height Z can be treated as constant.

The pixel position $(x_1, y_1)$ in the image plane of a target at position (Xt,Yt,Z) relative to the camera aiming direction may be expressed as:

$$x_1 = \frac{X_t x_0}{2Z\tan\left(\frac{\varphi_2}{2}\right)}, \; y_1 = \frac{Y_t x_0}{2Z\tan\left(\frac{\varphi_2}{2}\right)} \tag{23}$$

Determining the pixel position $(x_i, y_1)$ enables calculating the target position (Xt,Yt,Z).

After one or more targets have been identified in an image, the spatial position of the one or more targets may be determined using any of the methods described above. The particular method chosen may depend on the type of target, the size of the target and the number of targets. The spatial position of each target may be displayed such as numerically or graphically. The spatial position and its display may be used, for example, to warn personnel of the target being outside of a safe zone of spatial positions, or the target(s) moving in a direction likely to cause an unsafe condition if such motion continues. The target position may be tracked over time to determine such unsafe motion.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for determining a spatial position of an object from a camera image, comprising:
   obtaining an image with at least one camera;
   identifying the object in the image;
   determining at least one of a pixel size of the object in the image and a pixel offset of the object from a center of an image plane of the at least one camera;
   determining a distance between the object and the camera image plane using either the pixel size and the pixel offset;
   determining the spatial position using the distance and at least one known distance between the object and another element of the image; and
   displaying the spatial position of the object.

2. The method of claim 1 wherein the identifying the object comprises cross-correlating the image with a template image of the object.

3. The method of claim 2 further comprising calculating an intensity ratio of at least one color component in an object part of the image with an intensity ratio of the at least one color component in the template image.

4. The method of claim 1 wherein the determining the distance using the pixel size comprises associating a known size of the object with the distance and the pixel size.

5. The method of claim 1 wherein the determining the distance using the pixel size is automatically selected when the object is at least as large as a threshold pixel size in the image.

6. The method of claim 5 wherein the pixel size is correlated to the object when the object has a known size.

7. The method of claim 6 wherein the object comprises a sphere.

8. The method of claim 1 wherein the determining the distance using the pixel offset comprises associating the pixel offset with a known lateral separation between the object and the other element of the image.

9. The method of claim 8 wherein the known offset comprises a known distance between the object and a second object.

10. The method of claim 1 wherein the object and the other element comprise spherical targets disposed in a field of view of the camera, the method further comprising:
    determining a center target in the image by determining the one of the targets having a minimum value of a distance sum;
    determining an initial value of a camera position;
    generating a simulated image;
    calculating a metric based on target positions for various camera positions; and
    repeating calculating the metric until the metric falls below a selected threshold, wherein the camera position is determined; and
    repeating the generating the simulated image, calculating the metric and for all target associations.

11. A method for determining a spatial position of an object from a camera image, comprising:
    disposing a plurality of targets having a known spatial relationship in a field of view of at least one camera;
    obtaining an image of the field of view;
    determining a spatial position of the at least one camera using the known spatial relationship to calibrate image pixel separation to distance;
    determining the spatial position of the object using the determine spatial position and the calibrated pixel separation; and
    displaying the spatial position of the object.

12. The method of claim 11 further comprising correcting the calibrated pixel separation for orientation of an image plane of the at least one camera by determining a centermost one of the plurality of targets.

13. The method of claim 12 wherein the centermost one of the plurality of targets is determined by calculating a minimum distance sum, each distance sum comprising a sum of distances between each target in the image and all other targets in the image.

14. The method of claim 12 wherein the camera position is determined by assuming an initial camera position X Y;
    calculating a simulated image using the initial camera position;
    calculating a metric M based on positions within the image of each of the targets while varying the initial camera position;
    repeating the calculating the metric for each varied initial camera position until the metric falls below a selected threshold; and
    determining the camera position as the varied camera position when the metric falls below the selected threshold.

* * * * *